Sept. 10, 1940.                G. G. BURNETT                2,214,192
                    TRIPOD ADAPTER FOR PANORAMIC PHOTOGRAPHY
                            Filed April 17, 1939
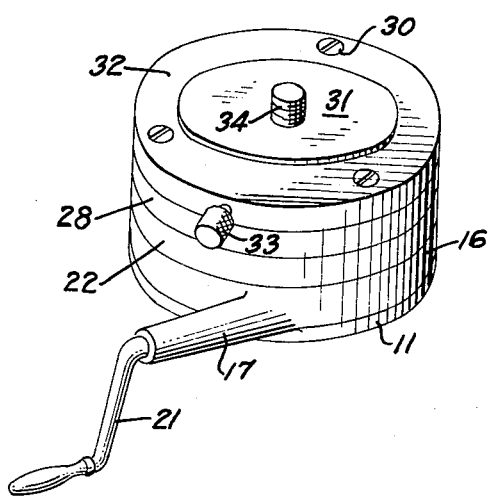
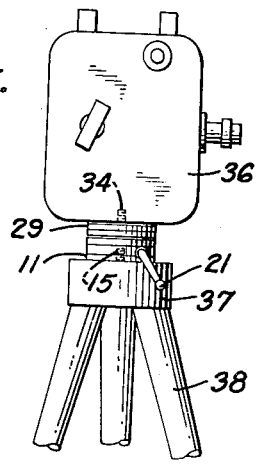
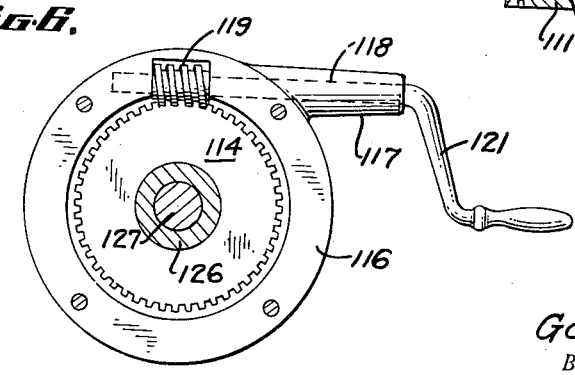
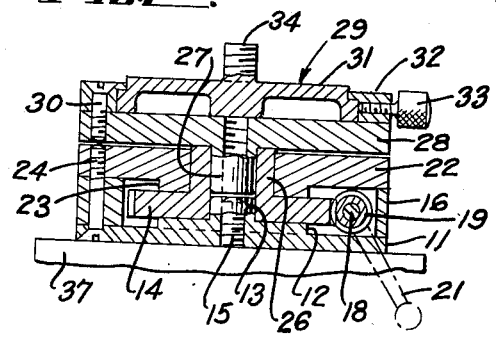
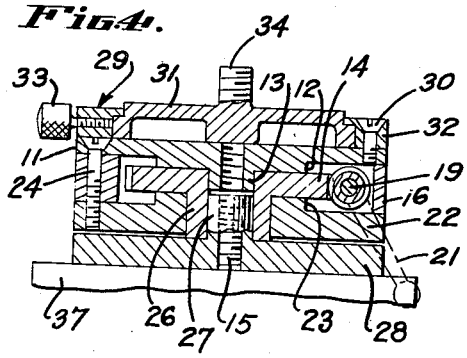
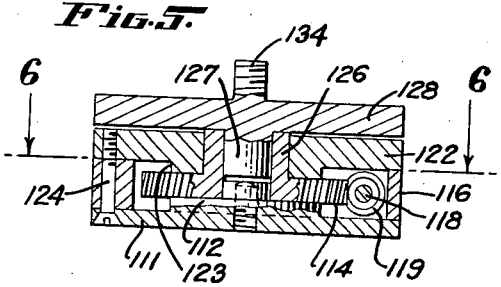
INVENTOR.
GORDON G. BURNETT
BY
Arlington L. White
ATTORNEY Patented Sept. 10, 1940

2,214,192

UNITED STATES PATENT OFFICE 2,214,192

TRIPOD ADAPTER FOR PANORAMIC PHOTOGRAPHY

Gordon G. Burnett, San Leandro, Calif.

Application April 17, 1939, Serial No. 268,215

5 Claims. (Cl. 248—186)

The invention, in general, relates to means for supporting a camera for uniform, rotatable movement through desired arcs for obtaining panoramic photographs. More particularly, the invention relates to an adapter for detachable and reversible connection to a tripod head of the conventional type to provide a rotatable support for a camera or the like.

Many camera enthusiasts frequently attempt to take panoramic photographs by holding the camera in the hands and moving the same through an arc. The results of this method of panoramic photography naturally depends entirely upon the steadiness of the hands of the operator throughout the entire swing of the camera. It seems apparent that precision work cannot be effectively accomplished in such manner, the resultant photograph often being indistinct and quite blurred. Even in the case of a camera supported upon a tiltable head, a satisfactory panoramic photograph cannot be obtained by moving the camera through an arc with the hands since the setting of the tiltable head is governed by a given amount of friction and the steadiness of the hands of the operator is affected in overcoming that friction. Heretofore, there has been developed different types of mechanism for effecting the rotation of a camera through an arc when carried upon a support. However, such mechanism has for the most part been incorporated in a structure forming an integral part of a tripod head, and the mechanism has been designed primarily for large scale motion picture work by experienced motion picture cameramen. Such mechanism, moreover, is not only of relatively expensive manufacture but also involves relatively heavy units.

It is perhaps well known that in certain of the aforementioned mechanisms carried by the tripod head the arrangement is such that the operator or cameraman is required to move about the tripod with the rotating camera in order to manipulate a crank or other member for actuating the mechanism. Other types of such mechanisms are operable in a manner which enables the cameraman to remain in one position while manipulating the actuating crank, the latter member also remaining stationary with respect to the rotatable movement of the camera which moves in a plane at substantially right angles to the plane of turning movement of the crank. Oftentimes, the cameraman or photographer desires to move about the tripod with the movement of the camera in order that he may be assured that the camera is reproducing the view exactly as he desires it. It also frequently happens that the cameraman is unable to move about a tripod because of the location thereof, and consequently he must have a tripod head incorporating a mechanism which would permit him to remain stationary while effecting the panoramic sweep of the camera.

A primary object of my invention is to provide a tripod adapter for panoramic photography which is reversibly attachable to a tripod so that a cameraman may either move about the tripod with the movement of the camera or so attach the adapter to the tripod that he may remain in one position while the camera swings through the desired arc.

Another object of the present invention is to provide an adapter of the indicated character which is of relatively inexpensive manufacture and of relatively light weight, thus affording its use by the individual camera enthusiast operating a small camera and desirous of having light-weight equipment.

A still further object of the present invention is to provide a tripod adapter of the aforementioned character which is of simple and compact construction and which eliminates the necessity of having two separate and independent mechanisms for effecting panoramic photography.

Another object of the present invention is to provide a panoramic adapter for camera tripods which affords a more rigid support for the camera and which reduces to a minimum the likelihood of the camera being jarred, shaken or vibrated upon manipulation of the actuating crank of the adapter.

Other objects of the invention, together with some of the advantageous features thereof, will appear from the following description of a preferred embodiment and one modification of the invention which are illustrated in the accompanying drawing. While I have shown a preferred and one modified embodiment of my invention in the drawing, it is to be understood that I am not to be limited to the precise embodiments illustrated, as my invention, as defined in the appended claims, may be embodied in a plurality and variety of forms.

Referring to the drawing:

Figure 1 is a perspective view of a preferred embodiment of the invention as assembled for use in one of its operative positions.

Figure 2 is a sectional elevation of the embodiment of the invention shown in Figure 1, parts thereof being broken away to illustrate the mode of assembly.

Figure 3 is a view of the preferred embodiment of the invention disposed in one of its operative positions and mounted upon a tripod head and supporting a camera.

Figure 4 is another sectional elevation of the preferred embodiment of my invention, this view also having parts broken away to show the mode of assembly and also showing another operative position of the device.

Figure 5 is a sectional elevational view of a modified embodiment of the invention.

Figure 6 is a view taken on the line 6—6 of Figure 5.

In its preferred form, the tripod adapter of my invention preferably comprises a base, a worm and worm gear in driving relation to each other and carried on said base, a crank for actuating said worm, a turn-table connected to said worm gear, means for securely fastening either said base or said turn-table to a tripod head so that, with the base connected to the head, actuation of said crank will effect rotation of said turn-table about the head and that, with the turn-table fastened to the head, actuation of said crank will effect rotation of said base as well as said crank about the tripod head, together with a plate adapted to be secured either to said base or to said turn-table, and means on said plate for securely connecting a camera to the adapter.

With particular reference to Figures 1 to 4 inclusive of the drawing, wherein I have depicted the preferred embodiment of my invention, it will be observed that I provide a base 11 which preferably is formed to a generally disc shape and which is provided with a boss 12 at its center together with an internally threaded apertured sleeve 13 which serves as a bearing for a worm gear 14 seating on the boss 12. The apertured sleeve 13 is internally threaded, as stated, in order that the base may be connected to a conventional tripod head by screwing the base onto the usual threaded stud 15 provided on the standard head of a tripod, see Figure 3 of the drawing. The adapter also includes an annulus 16 having a tangential, off-set portion 17 forming a bearing for a crank-shaft 18 which carries at its inner end a worm 19 so arranged thereon as to mesh with the worm gear 14, the annulus conveniently being recessed, as shown, to permit of establishment of a driving connection between the worm and the worm gear. The crank-shaft 18 conveniently is provided with a crank 21 for actuating the worm 19 as desired. As illustrated, I provide a centrally apertured cover plate or cap 22 carrying a boss 23 which seats on the worm gear and which is detachably connected to the annulus 16 and base 11 by any suitable means, such as by screws 24. It is clear that the cover plate 22, the annulus 16 and the base 11 constitute a compact gear box for the mechanism.

As shown particularly in Figures 2 and 4 of the drawing, the worm gear 14 is also provided with a hollow hub 26 which rotatively fits the aperture of the cap 22 and which snugly receives a sleeve 27 formed on a turn-table 28 thereby tightly connecting the turn-table with the worm gear for movement therewith in one operative position of the adapter, as hereinafter described. The turn-table likewise is formed to a disc shape with the sleeve 27 so arranged thereon as to be aligned with the hub 26 of the worm gear 14. The preferred embodiment of the adapter of my invention also includes a plate 29 which is adapted to be secured by any suitable means, such as the screws 30, either to the base 11 or to the turn-table 28, depending upon the choice of the cameraman as to the manner of using the adapter. Preferably, the plate 29 is formed of two members and includes a central disc 31 surrounded by an annulus 32, the disc being adjustably fastened to the annulus 32 by means of a set-screw 33 which pierces the annulus and bears against the periphery of the disc. With this arrangement of the two members, it is possible to set the disc 31 with respect to the annulus 32 in any selected one of a plurality of positions. The disc 31 of plate 29 is provided with an upstanding threaded stud 34 for conveniently connecting a camera to the plate by threading the stud into the usual threaded hole provided at the bottom of a motion picture camera of the standard type.

Figures 1 and 2 of the drawing illustrate the adapter of my invention so assembled for attachment to a conventional tripod head as to afford rotation of the turn-table 28 of the adapter about the tripod or other fixed support to which the adapter may be desired by an operator to be attached. In this assembly, the base 11 is at the bottom of the adapter and it may be screwed down tightly against a tripod head 37, as shown in Figure 3 of the drawing. As shown, the plate 29, in this assembly, is fastened to the turn-table 28 by means of the screws 30, thus presenting the threaded stud 34 at the top of the adapter for securely fastening the camera 36 thereto. As thus attached to a tripod head and supporting a motion picture camera, actuation of the crank 21 of the adapter will effect uniform rotation of the turn-table 28, as well as the connected plate 29 and camera 36, about the tripod. Thus, cameraman or operators desiring to remain in one position or of necessity having to remain in one position due to the location of the tripod, may use the adapter in this assembly of parts. Due to the adjustability of the disc 31 of the plate 29, as above described, the camera may be preliminarily focused upon a predetermined point by merely releasing the set-screw 33, rotating the disc 31 with respect to the annulus 32 of the plate, and then tightening set-screws 33 again when the camera has been properly focused. Thus, the cameraman can control the sweep of the camera from a given point through an arc of a desired extent to obtain the panoramic photograph.

Figure 4 of the drawing illustrates the adapter of the present invention so assembled as to afford rotation of the gear box including the crank 21 about the tripod 38. This assembly, with the exception of plate 29 which is still disposed at the top, constitutes an inversion of the adapter as compared to the assembly illustrated in Figures 1 to 3 inclusive. It will be observed that, in this assembly, the turn-table 28 is at the bottom of the adapter and is securely fastened to the tripod head 37 through the medium of the internally threaded sleeve 27 of the turn-table and the threaded stud 15 of the tripod head. Moreover, the plate 29 is attached by means of the screws 30 to the base 11 which is adjacent to the top of the adapter rather than at the bottom as before. Since the turn-table 28 is secured to the tripod head, it is clear that actuation of the crank 21 will effect rotation of the gear box including the annulus 16 and the base 11, together with the connected plate 29, as well as of the crank 21, about the tripod; the sleeve 27 of the turn-table 28 serving as a bearing for the worm gear 14. Thus, with the adapter as assembled in Figure 4 of the drawing attached to the tripod head, the cameraman or operator is permitted to check the panoramic view being photographed by moving about the tripod with the movement of the camera and the rotation of the crank therewith. It seems clear that the change from one form of assembly to the other form is relatively simple and can be effected rapidly and easily to suit the desires of the operator.

A modified embodiment of the invention is illustrated in Figures 5 and 6 of the drawing. This modification is of simple and compact construction and preferably comprises a base 111 which preferably is formed to a general disc shape and which carries a boss 112 at its center. The boss 112 has an upwardly extending hollow portion which is internally threaded to enable convenient and rapid attachment of the base to a tripod head of the conventional type by screwing the base onto the usual threaded stud provided on the head, all not shown in connection with this modification. The boss 112 of base 111 affords a seat for a worm gear 114 which is surrounded by an annulus 116 having a tangential, off-set portion 117 which serves as a bearing for a crank-shaft 118. The crank-shaft carries a worm 119 at its inner end so arranged thereon as to be in mesh with the worm gear 114, and carries a crank 121 at its outer end for conveniently actuating the worm, as desired. This modification includes a cap or closure 122 which carries a boss 123 for seating upon the worm gear 114 and which is detachably fastened to the annulus 116 and base 111 by screws 124 thus forming a gear box for the mechanism.

In accordance with the invention, the worm gear 114 is formed with an upwardly extending hollow hub 126 which fits into an aperture of the cap 122 and which snugly receives a depending sleeve 127 formed on a turn-table 128, thereby effecting a tight connection between the worm gear and the turn-table so that the two parts move in unison upon actuation of the crank 121. As illustrated in Figure 5 of the drawing, the turn-table 128 carries a stud 134 for attaching a camera to the adapter by screwing the stud into the usual threaded hole formed in the bottom of a conventional motion picture camera. With this modification of my invention secured to a tripod head, it is clear that actuation of the crank 121 effects a rotation of the turn-table and the connected camera about the tripod; the operator remaining in one position. The various parts of the adapter, both as to the preferred embodiment and the modification thereof, may be fabricated of relatively light weight metal as the duty on the device is not heavy.

The preferred embodiment of the invention, as well as the modification thereof, can readily be used in conjunction with a conventional tiltable head which may be inserted between the camera and the adapter.

It is to be understood that the appended claims are to be accorded a range of equivalents commensurate in scope with the advance made over the prior art.

I claim:

1. A tripod adapter for use in either one or the other of two positions in taking panoramic photographs, said adapter comprising a gear box, means for detachably connecting said box to a tripod head, a worm and a worm gear housed in said box in driving relation to each other, means for actuating said worm to effect movement of said worm gear relative to said box, a turn-table connected to said worm gear for movement in unison therewith, means on said turn-table for connecting a camera thereto, and means for detachably connecting said turn-table to a tripod head.

2. A tripod adapter for use in taking panoramic photographs and adapted to be used in one or the other of two positions, said adapter comprising a gear box including a base, means on said base for securing said box to the head of a tripod, a worm and a worm gear housed in said gear box and in driving relation to each other, means for actuating said worm to effect movement of said worm gear relative to said box, a turn-table connected to said worm gear for movement in unison therewith, means on said turn-table for securing the same to a tripod head, a plate adapted to be detachably fastened to said turn-table; said plate also being adapted to be detachably fastened to said base, and means on said plate for connecting a camera to the adapter.

3. A tripod adapter for use in panoramic photography and adapted to be used in one or the other of two positions, said adapter comprising a base, a worm and a worm gear supported on said base in driving relation to each other, means including a crank for actuating said worm, a turn-table connected to said worm gear, means on said base for fastening the same to the head of a tripod, means on said turn-table for fastening the same to the head of a tripod, a plate adapted to be detachably fastened to said turn-table; said plate also being adapted to be detachably fastened to said base, means on said plate for connecting a camera to the adapter; actuation of said crank with the base fastened to the tripod head effecting rotation of said turn-table about the tripod head while actuation of said crank with said turn-table fastened to the tripod head effects rotation of said base as well as said crank about the tripod head.

4. A tripod adapter as defined in claim 3 and including means on said plate for initially setting a camera on said plate in any desired one of a plurality of positions.

5. A tripod adapter for use in panoramic photography and adapted to be reversibly used to meet the need or desires of the user, said adapter consisting of a base, means on said base for detachably connecting the same to a tripod head, a turn-table, means in said base in driving connection with said turn-table, and means for detachably fastening said turn-table to a tripod head; said turn-table being movable relative to the tripod head when the base is connected to the head and said base being movable relative to the tripod head when the adapter is reversed and the turn-table is fastened to the head.

GORDON G. BURNETT.